Patented July 29, 1924.

1,503,422

UNITED STATES PATENT OFFICE.

JULIUS E. LAURILA, OF WORCESTER, MASSACHUSETTS.

METHOD OF MAKING PUTTY.

No Drawing. Application filed June 16, 1922. Serial No 568,863.

*To all whom it may concern:*

Be it known that I, JULIUS E. LAURILA, a citizen of the Republic of Finland, residing at Worcester, in the county of Worcester and Commonwealth of Massachusetts, have invented a new and useful Improvement in a Method of Making Putty, of which the following is a specification.

My invention relates to the manufacture of putty, and has for its object to provide an improved method of mixing the ingredients entering into the same, whereby a putty is produced which is much more durable than putty mixed in the ordinary manner.

In carrying out my improved method, I first mix ordinary whiting (calcium carbonate) with linseed oil in the usual proportion, to obtain a mixture of dough-like consistency, or in other words, ordinary putty. I then heat a quantity of fine white sand, throughly washed, to a temperature of about 200° F., and then mix the heated sand with the previously made putty. In mixing the sand with the putty, I add the sand gradually, at the same time adding additional whiting and linseed oil to maintain the dough-like consistency of the entire mixture. I continue to add the heated sand, together with the other ingredients, to the mixture, until the sand is from between 20 to 30%, by volume, of the entire mixture. The putty may then be applied in the usual manner for the purpose of holding window glass in place, filling holes in wood work, and for other analogous purposes.

I have discovered that putty mixed in accordance with my improved method is far more durable than ordinary putty, in that it will not crack and break off when employed in exposed places, and I attribute the superior wearing qualities of my putty to the fact that the fine white sand is added to the mixture when in a heated condition. I have also discovered that the degree of hardness of the putty, after it has been applied and allowed to set, can be regulated by varying the proportion of heated sand in the mixture, between the above mentioned limits; the greater the proportion of sand, the harder will be the putty after it has set.

From the foregoing then, it is apparent that by the practice of my improved method of mixing whiting, linseed oil, and heated sand, there will be produced a putty which is adapted for all of the uses of ordinary putty, and in addition possesses greater strength and durability than is found in putty mixed in the ordinary manner.

I claim:

1. A method of making putty, which consists in first combining whiting and linseed oil to form a mixture of dough-like consistency, and then adding fine hot sand to the mixture.

2. A method of making putty, which consists in combining whiting, linseed oil and hot sand to form a mixture of dough-like consistency.

3. A method of making putty by combining whiting, linseed oil and hot sand to form a mixture of dough-like consistency, the sand being 20 to 30%, by volume, of the mixture.

JULIUS E. LAURILA.